United States Patent
Matsushita et al.

(10) Patent No.: US 6,822,351 B2
(45) Date of Patent: Nov. 23, 2004

(54) LOW-PROFILE STEPPING MOTOR WITH TWO COILS ARRANGED FLUSH WITH EACH OTHER HORIZONTALLY

(75) Inventors: Kunitake Matsushita, Shizuoka-ken (JP); Hiroshi Sano, Shizuoka-ken (JP); Toshihiko Nagata, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/655,414

(22) Filed: Sep. 4, 2003

(65) Prior Publication Data

US 2004/0061388 A1 Apr. 1, 2004

(30) Foreign Application Priority Data

Sep. 27, 2002 (JP) ........................................ 2002-283511

(51) Int. Cl.[7] ............................ H02K 37/00; H02K 1/12
(52) U.S. Cl. ..................................... 310/49 R; 310/257
(58) Field of Search ................................ 310/49 R, 42, 310/254, 257

(56) References Cited

U.S. PATENT DOCUMENTS 4,841,189 A * 6/1989 Cooper et al. .............. 310/257
4,884,333 A * 12/1989 Cooper et al. ................. 29/596
4,959,578 A * 9/1990 Varga .......................... 310/268
6,100,620 A * 8/2000 Radovsky .................... 310/268

FOREIGN PATENT DOCUMENTS

DE 41 33 260 A1 4/1992
FR 2 793 966 A1 11/2000
JP 10-094237 4/1998

* cited by examiner

*Primary Examiner*—Tran Nguyen
(74) *Attorney, Agent, or Firm*—Choate, Hall & Stewart

(57) ABSTRACT

A low-profile stepping motor has a stator assembly structured such that first and second coil units are disposed flush with each other horizontally and are sandwiched between upper and lower stator yoke pieces each comprising first and second stator yokes which are punched out integrally with each other, are shaped symmetrically, and which each have a plurality of pole teeth along its semi-circular inner circumference. The upper and lower stator yoke pieces are fixedly put together by means of two studs lodged fittingly inside respective bobbins of the first and second coil units such that the studs have their both ends tightly engaging with holes formed in the upper and lower stator yoke pieces, whereby the coil units are surely held between the upper and lower stator yoke pieces.

6 Claims, 4 Drawing Sheets

LOW-PROFILE STEPPING MOTOR WITH TWO COILS ARRANGED FLUSH WITH EACH OTHER HORIZONTALLY

BACKGROUND OF THE INVENTION

1. Field of the Invention

The present invention relates to a stepping motor, and specifically to a low-profile stepping motor having its dimension reduced in an axial direction.

2. Description of the Related Art

Recently, in accordance with enhanced performance of various devices such as printers, facsimiles and floppy (Registered Trademark) disk drives, a stepping motor is required to be higher in torque, and lower in cogging torque and vibration. Under the circumstance, a PM (permanent magnet) stepping motor has been extensively used to meet the requirements.

FIG. 1 is a partly cutaway perspective view of a conventional PM stepping motor. Referring to FIG. 1, the PM stepping motor generally comprises: a stator assembly 6 composed of two stator units 6A and 6B; a rotor assembly 13; a face plate 1 punched out of a stainless steel plate; and a front bearing 2 made of oil impregnated alloy. The stator units 6A and 6B each comprise: stator yokes 3a and 3b punched out of a soft magnetic steel plate and each having a plurality of pole teeth 10 bent up along its inner circumference; and a coil 4 formed such that a copper wire with polyurethane insulation is wound on a bobbin 5 housed in the stator yokes 3a and 3b, and are attached back-to-back to each other. The rotor assembly 13 comprises: a rotary shaft 8; a cylindrical magnet 9 for magnetic field, having a plurality of magnetic poles at its circumferential surface, and having its circumferential surface opposing the pole teeth 10 of the stator yokes 3a, 3b; and a sleeve 12 to fasten the cylindrical magnet 9 and the rotary shaft 8 together such that the rotary shaft 8 is press fitted into the sleeve 12, and the sleeve 12 with adhesive applied thereon is inserted into the cylindrical magnet 9. The rotor assembly 13 thus structured has its outer circumference (of the magnet 9) magnetized for a predetermined number of magnetic poles, and is rotatably disposed inside the stator assembly 6 such that the rotary shaft 8 is supported by the front bearing 2 and a rear bearing (not shown in FIG. 1), and that the magnetic poles oppose the pole teeth 10 with a slight gap therebetween.

FIG. 2 is a partly cross-sectioned view of the stator unit 6A of the conventional PM stepping motor shown in FIG. 1. The stator unit 6B attached to the stator unit 6A is of the same structure as the stator unit 6A and is omitted. The stator units 6A and 6B are each structured such that the pole teeth 10 of the stator yoke 3a mesh with the pole teeth 10 of the stator yoke 3b equidistantly from each other with a shift by an electrical angle of 180 degrees (half pitch). The stator units 6A and 6B thus structured are joined back-to-back to each other by molding with polymeric material or plasma welding such that their respective pole teeth 10 and 10 are shifted from each other by an electrical angle of 90 degrees, whereby the rotor assembly 13 (shown in FIG. 1) always starts its rotation in the same direction.

FIG. 3 is a developed view of the stator yokes 3a and 3b of the conventional PM stepping motor. In the embodiment the stator units 6A and 6B each have ten pole teeth 10 in a spatial angle of 360 degrees, which are arrayed at an interval corresponding to that of the magnetic poles (not shown) formed on the cylindrical magnet 9.

Recently, since the devices incorporating PM stepping motors are required to be downsized and lower profiled as described above, the PM stepping motors are also required to be lower profiled. The conventional PM stepping motor, however, is composed of two stator units joined to each other back-to-back therefore making it extremely difficult or almost impossible to further reduce its profile. And the conventional PM stepping motor uses four discrete stator yokes, which inevitably increases the number of the components and makes alignment troublesome.

SUMMARY OF THE INVENTION

The present invention has been made in view of the above circumstance, and it is an object of the present invention to provide a low-profile stepping motor which is of a simple structure and which has its dimension drastically reduced in the axial direction.

In order to achieve the object, according to a first aspect of the present invention, a low-profile stepping motor generally comprises a first stator unit, a second stator unit, and a rotor assembly including a cylindrical magnet. The first stator unit includes: a first upper stator yoke having a plurality of pole teeth which are formed along its semicircular inner circumference; a first lower stator yoke having a plurality of pole teeth which are formed along its semicircular inner circumference and which mesh with the pole teeth of the first upper stator yoke with a shift by an electrical angle of 180 degrees; and a first coil unit fixedly sandwiched between the first upper and lower stator yokes. The second stator unit includes: a second upper stator yoke formed as one piece integrally with the first upper stator yoke, and having a plurality of pole teeth which are formed along its semicircular inner circumference; a second lower stator yoke formed as one piece integrally with the first lower stator yoke, and having a plurality of pole teeth which are formed along its semicircular inner circumference and which mesh with the pole teeth of the second upper stator yoke with a shift by an electrical angle of 180 degrees; and a second coil unit fixedly sandwiched between the second upper and lower stator yokes and arranged horizontally flush with the first coil unit. Any two pole teeth adjacent to each other with one formed on the first upper stator yoke and the other formed on the second upper stator yoke are shifted from each other by an electrical angle of either 90 degrees or 270 degrees, and any two pole teeth adjacent to each other with one formed on the first lower stator yoke and the other formed on the second lower stator yoke are shifted from each other by an electrical angle of either 90 degrees or 270 degrees. The rotor assembly is rotatably disposed in a circular open space defined by the pole teeth of the first and second stator units. With this structure, the low-profile stepping motor has its axial dimension almost halved without sacrificing its performance, and reduces the number of components thereby achieving cost reduction.

According to a second aspect of the present invention, in the low-profile stepping motor of the first aspect, the first upper and lower stator yokes are fixedly put together by means of a stud such that the stud has its top end squeezed into a hole formed at a predetermined place of the first upper stator yoke and has its bottom end squeezed into a hole formed at a predetermined place of the first lower stator yoke, and the second upper and lower stator yokes are fixedly put together by means of a stud such that the stud has its top end squeezed into a hole formed at a predetermined place of the second upper stator yoke and has its bottom end squeezed into a hole formed at a predetermined place of the second lower stator yoke. With this structure, the stator yokes can be easily and surely aligned to each other thereby reducing cost.

According to a third aspect of the present invention, in the low-profile stepping motor of the second aspect, the coil unit is structured such that a winding is provided around the stud. Accordingly, the coil unit can be easily mounted thereby reducing cost.

According to a fourth aspect of the present invention, in the low-profile stepping motor of the first aspect, a pair of slot cuts are provided at a midway portion between the first and second upper stator yokes, and a pair of slot cuts are provided at a midway portion between the first and second lower stator yokes. This structure keeps the first and second stator units from having respective magnetic influence on each other thereby achieving a smooth rotation.

According to a fifth aspect of the present invention, in the low-profile stepping motor of the fourth aspect, the slot cuts each have a length measuring at least two-thirds of the width of the midway portion between the first and second stator yokes. When the slot cuts are arranged to have their lengths equal to two-thirds of the width of the midway portion, the magnetic influence can be surely minimized while an adequate strength can be maintained at the midway portion. And the lengths of the slot cuts can still be increased if so required, as long as the midway portion retains a minimum strength required.

According to a sixth aspect of the present invention, in the low-profile stepping motor of the first aspect, the pole teeth taper off toward their distal ends so as to be shaped trapezoidal. This configuration of the pole teeth ensures an accurate assembly of the first and second upper stator yokes and the first and second lower stator yokes.

DETAILED DESCRIPTION OF THE PREFERRED EMBODIMENTS

A preferred embodiment of the present invention will hereinafter be described with reference to the accompanying drawings.

Figure 1:
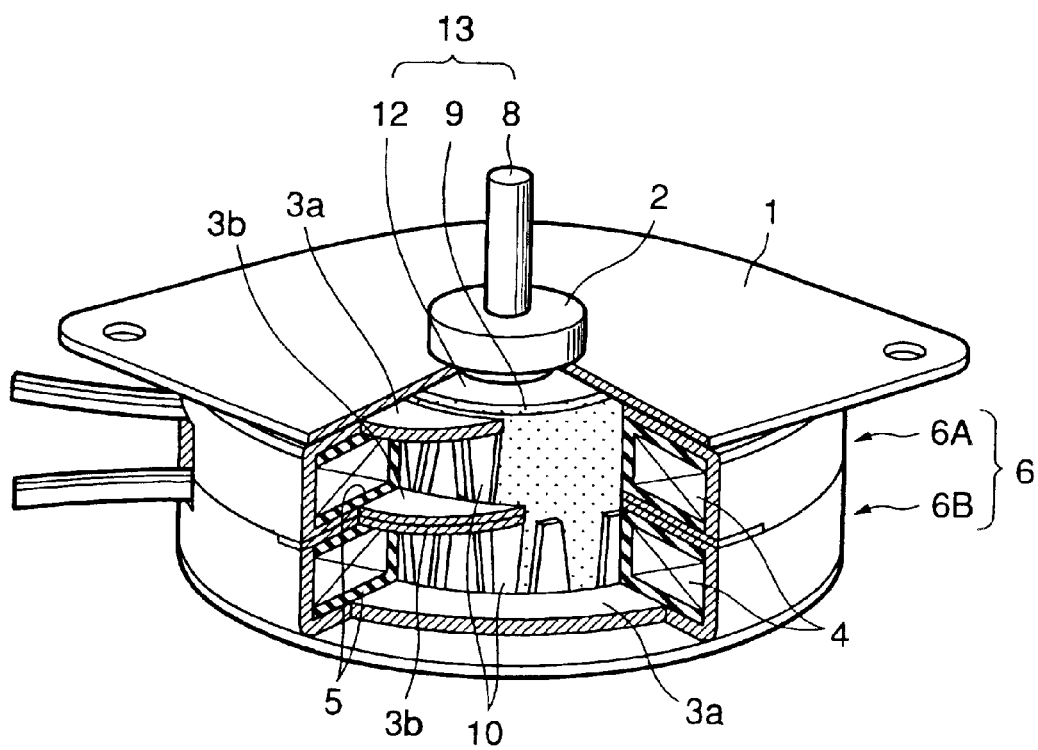
FIG. 1 is a partly cutaway view of a conventional PM stepping motor.
Figure 2:
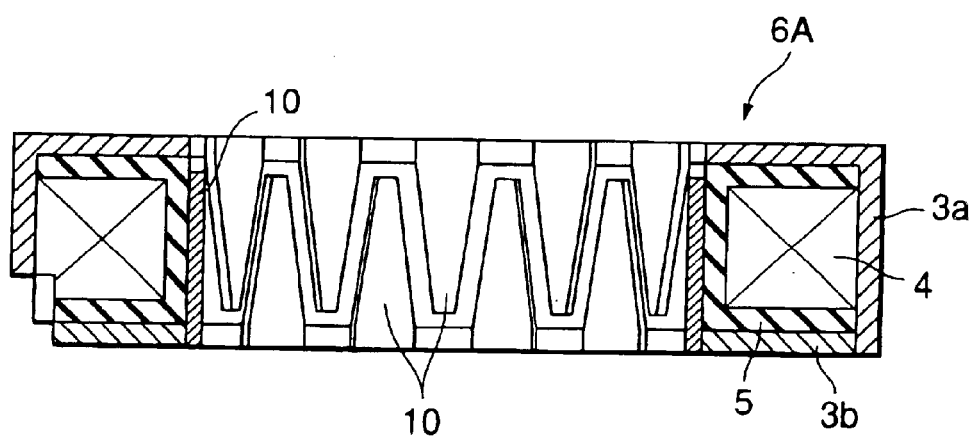
FIG. 2 is a partly cross-sectioned view of a stator unit of the conventional PM stepping motor of FIG. 1.
Figure 3:
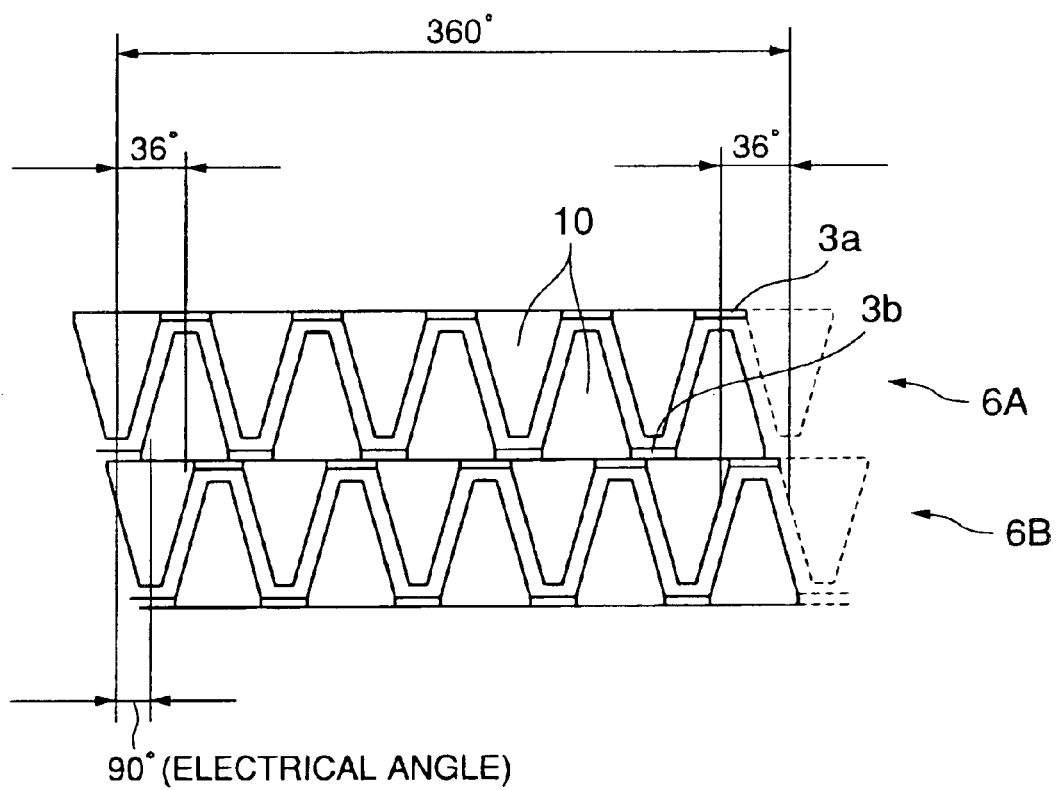
FIG. 3 is a developed view of stator yokes of the conventional PM stepping motor of FIG. 1.
Figure 4:
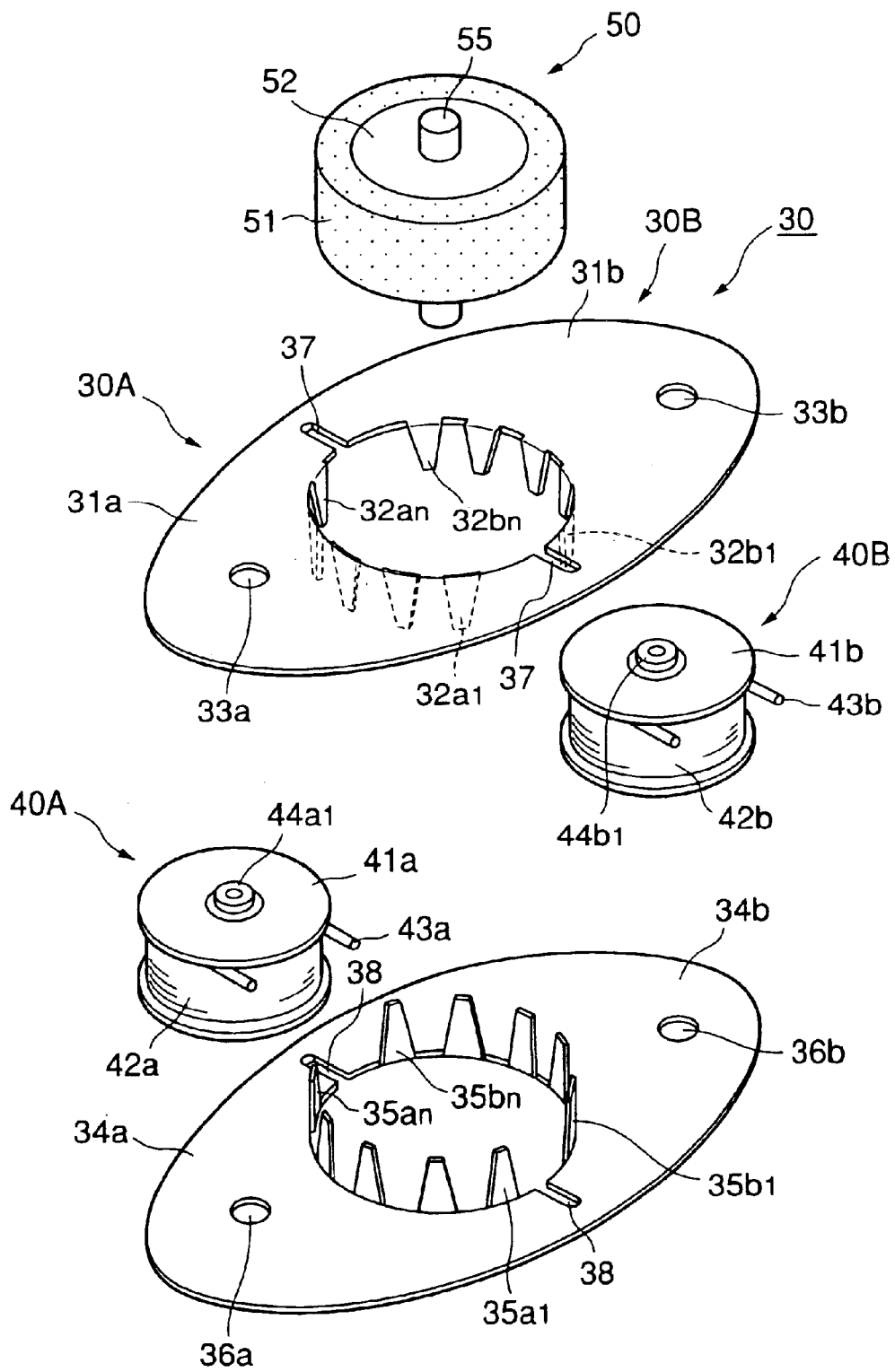
FIG. 4 is an exploded perspective view of a low-profile stepping motor according to the present invention.

Referring to FIG. 4, a low-profile stepping motor of the present invention generally comprises: a stator assembly 30 including first and second stator units 30A and 30B assembled to be horizontally flush with each other; and a rotor assembly 50 rotatably disposed inside the stator assembly 30.

The first stator unit 30A comprises: first upper and lower stator yokes 31a and 34a; and a first coil unit 40A which is composed of a bobbin 41a and a winding 42a provided around the bobbin 41a, is sandwiched between the first upper and lower stator yokes 31a and 34a, and which is provided with a terminal pin 43a. The first upper stator yoke 31a is punched out of a soft magnetic steel plate, includes a plurality of pole teeth 32a1 to 32an punched out of the soft magnetic steel plate and bent up inward (downward in FIG. 4) at its semicircular inner circumference, and has a hole 33a for engaging with a top protrusion 44a1 of the first coil unit 40A. The first lower stator yoke 34a is punched out of a soft magnetic steel plate, includes a plurality of pole teeth 35a1 to 35an punched out of the soft magnetic steel plate and bent up inward (upward in FIG. 4) at its semicircular inner circumference, and has a hole 36a for engaging with a bottom protrusion 44a2 (see FIG. 5) of the first coil unit 40A.

The second stator unit 30B comprises: second upper and lower stator yokes 31b and 34b punched out as one piece integrally with the first upper and lower stator yokes 31a and 34a, respectively; and a second coil unit 40B which is composed of a bobbin 41b and a winding 42b provided around the bobbin 41b, is sandwiched between the second upper and lower stator yokes 31b and 34b, and which is provided with a terminal pin 43b. The second upper stator yoke 31b is punched out of a soft magnetic steel plate, includes a plurality of pole teeth 32b1 to 32bn punched out of the soft magnetic steel plate and bent up inward (downward in FIG. 4) at its semicircular inner circumference, and has a hole 33b for accepting a top protrusion 44b1 of the second coil unit 40B. The second lower stator yoke 34b is punched out of a soft magnetic steel plate, includes a plurality of pole teeth 35b1 to 35bn punched out of the soft magnetic steel plate and bent up inward (upward in FIG. 4) at its semicircular inner circumference, and has a hole 36b for receiving a bottom protrusion 44b2 (see FIG. 5) of the second coil unit 40B.

The plurality of pole teeth 32a1 to 32an of the first upper stator yoke 31a and the plurality of pole teeth 32b1 to 32bn of the second upper stator yoke 31b are punched out simultaneously, and the plurality of pole teeth 35a1 to 35an of the first lower stator yoke 34a and the plurality of pole teeth 35b1 to 35bn of the second lower stator yoke 34b are punched out simultaneously.

Each stator yoke has pole teeth provided in number corresponding to the required number of steps per rotation of a stepping motor and arranged equidistant from one another. The pole teeth 32a1 to 32an of the first upper stator yoke 31a and the pole teeth 35a1 to 35an of the first lower stator yoke 34a mesh with each other with a shift by an electrical angle of 180 degrees, and the pole teeth 32b1 to 32bn of the second upper stator yoke 31b and the pole teeth 35b1 to 35bn of the second lower stator yoke 34b mesh with each other with a shift by an electrical angle of 180 degrees.

In each of the upper and lower stator yokes of the first and second stator units 30A and 30B thus structured, two pole teeth adjacent to each other sandwiching one of a pair of slot cuts 37 or 38 (detailed hereinafter) are shifted from each other by an electrical angle of 90 degrees or 270 degrees. Specifically, in the first and second upper stator yokes 31a and 31b, the pole tooth 32a1 is shifted by an electrical angle of 90 degrees or 270 degrees from the pole tooth 32b1 adjacent to the pole tooth 32a1 sandwiching one slot cut 37, and the pole tooth 32an is shifted by an electrical angle of 90 degrees or 270 degrees from the pole tooth 32bn adjacent to the pole tooth 32an sandwiching the other slot cut 37, and in the first and second lower stator yokes 34a and 34b, the pole tooth 35a1 is shifted by an electrical angle of 90 degrees or 270 degrees from the pole tooth 35b1 adjacent to the 35a1 sandwiching one slot cut 38, and the pole tooth 35an is shifted by an electrical angle of 90 degrees or 270 degrees from the pole tooth 35bn adjacent to the pole tooth 35an sandwiching the other slot cut 38.

The first and second upper stator yokes 31a and 31b are punched out as one piece such that the pair of slot cuts 37 above mentioned are formed right midway between the first and second upper stator yokes 31a and 31b thereby minimizing magnetic interflow tehrebetween so as not to have magnetic influence on each other, and the first and second lower stator yokes 34a and 34b are punched out as one piece such that the pair of slot cuts 38 above mentioned are formed right midway between the first and second lower stator yokes 34a and 34b thereby minimizing magnetic interflow therebetween so as not to have magnetic influence on each other. The slot cuts 37 and 38 should preferably be as long as possible without detriment to the strength. Specifically, the slot cuts 37 and 38 with their length measuring at least two-thirds of the width of the midway portion work satisfactorily for a smooth rotation.

The rotor assembly 50 comprises: a cylindrical magnet 51 formed of ferrite magnet, rear-earth magnet and so forth and magnetized at regular intervals; a rotary shaft 55 made of non-magnetic stainless steel; and a sleeve 52 made of aluminum, and is structured such that the cylindrical magnet 51 is adhesively fixed to the sleeve 52 which has the rotary shaft 55 press-fitted thereinto. The rotor assembly 50 is rotatably disposed inside the stator assembly 30 with a slight gap between the cylindrical magnet 51 and the pole teeth of the stator assembly 30.

Figure 5:
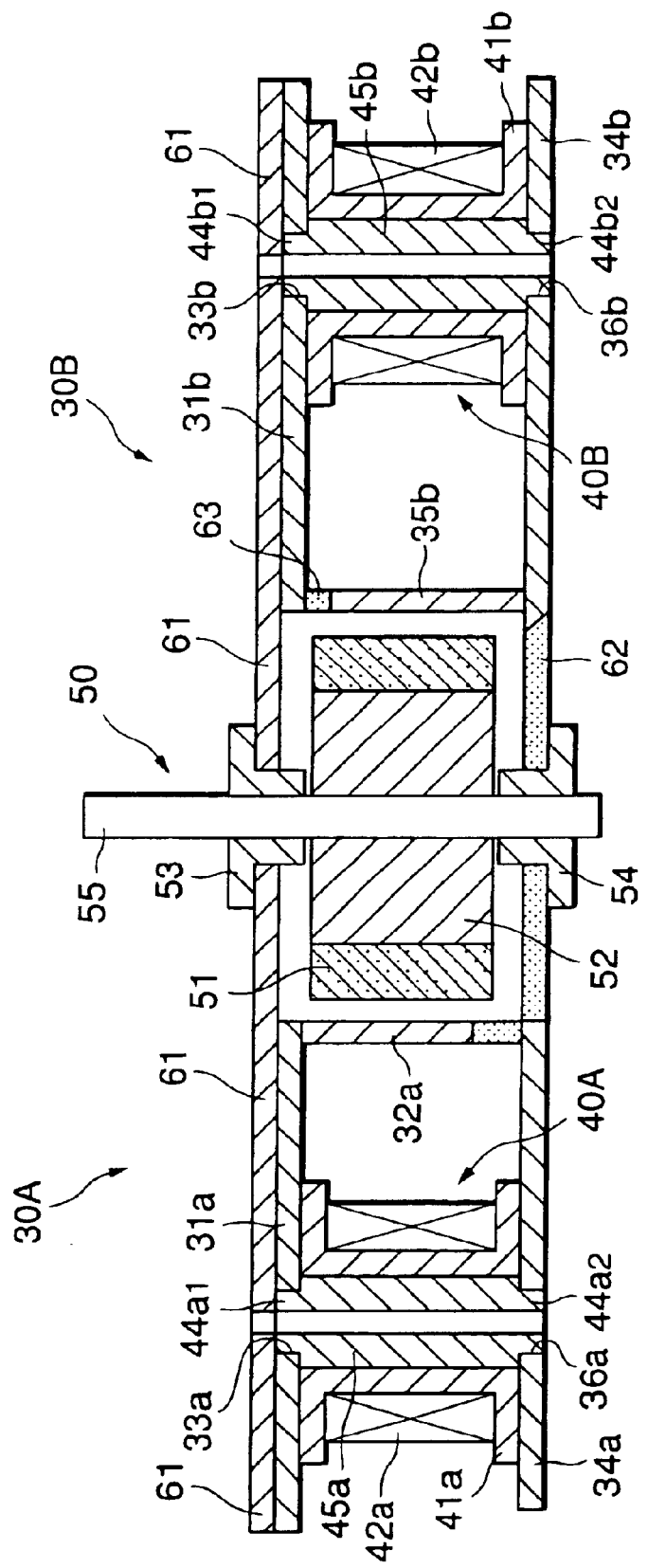
FIG. 5 is a cross sectional view of the low-profile stepping motor of FIG. 3.

Referring to FIG. 5, the first coil unit 40A includes: the aforementioned bobbin 41a; the aforementioned winding 42a provided around the bobbin 41a; and a hollow-cylindrical stud 45a made of metal, disposed inside the bobbin 41a, and provided with the top and bottom protrusions 44a1 and 44a2, and the second coil unit 40B includes: the aforementioned bobbin 41b; the aforementioned winding 42b provided around the bobbin 41b; and a hollow-cylindrical stud 45b made of metal, disposed inside the bobbin 41b, and provided with the top and bottom protrusions 44b1 and 44b2.

The first and second coil units 40A and 40B are put together respectively with the first and second stator units 30A and 30B such that the top and bottom protrusions 44a1 and 44a2 of the first coil unit 40A are inserted respectively into the holes 33a and 36a of the first upper and lower stator yokes 31a and 34a and that the top and bottom protrusions 44b1 and 44b2 of the second coil unit 40B are inserted respectively into the holes 33b and 36b of the second upper and lower stator yokes 31b and 34b. In the process of putting together, adhesive may be applied between the protrusions and the holes for reinforcement. The stud 45a, together with the winding 42a and the first upper and lower stator yokes 31a and 34a, constitutes a part of a closed magnetic path, and the stud 45b, together with the winding 42b and the second upper and lower stator yokes 31b and 34b, constitutes a part of a closed magnetic path. Thanks to the studs 45a and 45b, the first and second coil units 40A and 40B can be easily put together with the first and second stator units 30A and 30B, and also the first and second upper stator yokes 31a and 31b can be easily and surely aligned with the first and second lower stator yokes 34a and 34b.

A pole tooth 32a represents one pole tooth of the first upper stator yoke 31a, and a pole tooth 35b represents one pole tooth of the second lower stator yoke 34b. Resin is filled in a gap space between the meshing pole teeth for reinforcement thereby forming a resin portion 63, which develops a vibration-proof structure.

A face plate 61, which is punched out of a non-magnetic steel plate and has a front bearing 53 attached thereto, is fixed to the first and second upper stator yokes 31a and 31b by welding, bonding or other methods. A resin wall 62 is formed by resin-molding while the rotor assembly 50 is disposed between the stator units 30A and 30B with the rotary shaft 55 inserted through the front bearing 53. A rear bearing 54 is attached to the resin wall 62, and the rotor assembly 50 is rotatably disposed with the rotary shaft 55 supported by the front and rear bearings 53 and 54. The resin wall 62 may be replaced by a plate which, like the face plate 61, is punched out of a non-magnetic steel plate, and be fixed to the first and second lower stator yokes 34a and 34b.

Thus, since the low-profile stepping motor of the present invention is composed of the stator assembly 30 which is structured such that the first and second stator units 30A and 30B are flush with each other horizontally and have their respective pole teeth shifted from each other by an electrical angle predetermined, the profile thereof is reduced approximately to half without sacrificing its performance, compared with the conventional PM stepping motor which has two stator units stacked vertically and concentrically. Further, the low-profile stepping motor of the present invention uses two stator yoke pieces each comprising two stator yokes, which not only reduces the number of components but also eases dramatically the alignment of the stator yokes, thereby lowering the cost compared with the conventional PM stepping motor which uses four discrete stator yokes resulting in increasing the number of components and complicating the alignment of the stator yokes.

What is claimed is:

1. A low-profile stepping motor comprising
a first stator unit including: a first upper stator yoke having a plurality of pole teeth which are formed along its semicircular inner circumference; a first lower stator yoke having a plurality of pole teeth which are formed along its semicircular inner circumference and which mesh with the pole teeth of the first upper stator yoke with a shift by an electrical angle of 180 degrees; and a first coil unit fixedly sandwiched between the first upper and lower stator yokes,
a second stator unit including: a second upper stator yoke formed as one piece integrally with the first upper stator yoke, and having a plurality of pole teeth which are formed along its semicircular inner circumference; a second lower stator yoke formed as one piece integrally with the first lower stator yoke, and having a plurality of pole teeth which are formed along its semicircular inner circumference and which mesh with the pole teeth of the second upper stator yoke with a shift by an electrical angle of 180 degrees; and a second coil unit fixedly sandwiched between the second upper and lower stator yokes and arranged horizontally flush with the first coil unit, wherein any two pole teeth adjacent to each other with one thereof being formed on the first upper stator yoke and the other formed on the second upper stator yoke are shifted from each other by an electrical angle of either 90 degrees or 270 degrees, and any two pole teeth adjacent to each other with one thereof being formed on the first lower stator yoke and the other formed on the second lower stator yoke are shifted from each other by an electrical angle of either 90 degrees or 270 degrees, and
a rotor assembly including a cylindrical magnet and rotatably disposed in a circular open space defined by the pole teeth of the first and second stator units.

2. A low-profile stepping motor according to claim 1, wherein the first upper and lower stator yokes are fixedly put together by means of a stud such that the stud has its top end squeezed into a hole formed at a predetermined place of the first upper stator yoke and has its bottom end squeezed into a hole formed at a predetermined place of the first lower stator yoke, and the second upper and lower stator yokes are fixedly put together by means of a stud such that the stud has its top end squeezed into a hole formed at a predetermined place of the second upper stator yoke and has its bottom end squeezed into a hole formed at a predetermined place of the second lower stator yoke.

3. A low-profile stepping motor according to claim 2, wherein the coil unit is structured such that a winding is provided around the stud.

4. A low-profile stepping motor according to claim 1, wherein a pair of slot cuts are provided at a midway portion between the first and second upper stator yokes, and a pair of slot cuts are provided at a midway portion between the first and second lower stator yokes.

5. A low-profile stepping motor according to claim 4, wherein the slot cuts each have a length measuring at least two-thirds of a width of the midway portion between the first and second stator yokes.

6. A low-profile stepping motor according to claim 1, wherein the pole teeth taper off toward their distal ends so as to be shaped trapezoidal.

* * * * *